United States Patent
Izadi et al.

(10) Patent No.: US 12,287,627 B2
(45) Date of Patent: Apr. 29, 2025

(54) VIRTUAL E-PALLET INTERFACE

(71) Applicant: GM GLOBAL TECHNOLOGY OPERATIONS LLC, Detroit, MI (US)

(72) Inventors: Hojjat Izadi, North York (CA); Mahdokht Ezati, Pickering (CA); Mohammad Hossein Beheshti, Oshawa (CA); Jonathan From, Peterborough (CA); Martin Juhas, Oshawa (CA); Johnson Qu, Vaughan (CA); Carlos Arreaza, Oakville (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 239 days.

(21) Appl. No.: 18/171,768

(22) Filed: Feb. 21, 2023

(65) Prior Publication Data
US 2024/0280983 A1    Aug. 22, 2024

(51) Int. Cl.
*G05D 1/00* (2024.01)
*B65D 19/38* (2006.01)

(52) U.S. Cl.
CPC ........... *G05D 1/0027* (2013.01); *B65D 19/38* (2013.01); *G05D 1/0077* (2013.01); *G05D 1/0246* (2013.01); *G05D 1/028* (2013.01); *B65D 2519/00776* (2013.01)

(58) Field of Classification Search
CPC .. G05D 1/0027; G05D 1/0077; G05D 1/0246; G05D 1/028; G05D 1/00; B65D 19/38; B65D 2519/00776; B60L 2200/44; B60L 2260/32; B60L 3/12; H04N 23/50; G06F 3/011

See application file for complete search history.

(56) References Cited

U.S. PATENT DOCUMENTS

| | | | |
|---|---|---|---|
| 8,103,417 B2* | 1/2012 | Gharsalli | ................ E02F 3/844 318/587 |
| 11,200,532 B2* | 12/2021 | Peterson | ............ G07C 9/00896 |
| 2024/0160212 A1* | 5/2024 | Amer | .................... G05D 1/0291 |

FOREIGN PATENT DOCUMENTS

| | | |
|---|---|---|
| DE | 102022123773 A1 | 4/2023 |
| DE | 102022123837 A1 | 5/2023 |

* cited by examiner

*Primary Examiner* — Michael V Kerrigan
(74) *Attorney, Agent, or Firm* — Lorenz & Kopf LLP

(57) ABSTRACT

Methods and systems for controlling movement of an e-pallet includes one or more sensors configured to obtain sensor data as to a user of the e-pallet, a second e-pallet, or both; and a processor coupled to the one or more sensors and configured to at least facilitate: determining, using the sensor data, a relative position of the user, the second e-pallet or both, with respect to the e-pallet; determining, using the sensor data, a relative orientation of the user, the second e-pallet or both, with respect to the e-pallet; and taking a control action for the e-pallet, in accordance with instructions provided by the processor, based on both the relative position and the relative orientation.

16 Claims, 10 Drawing Sheets

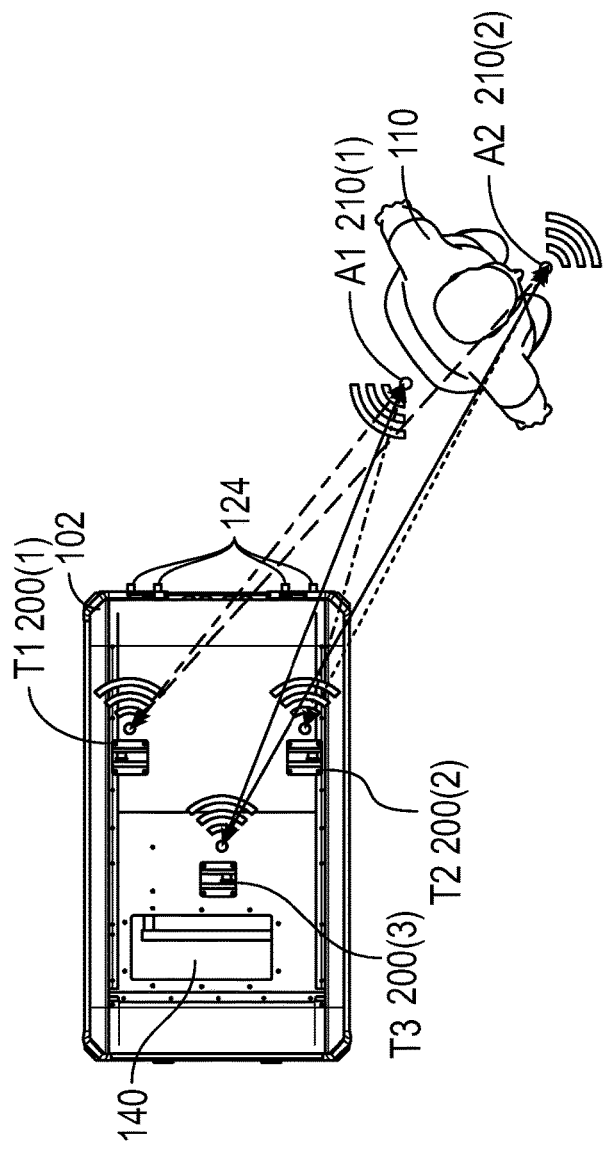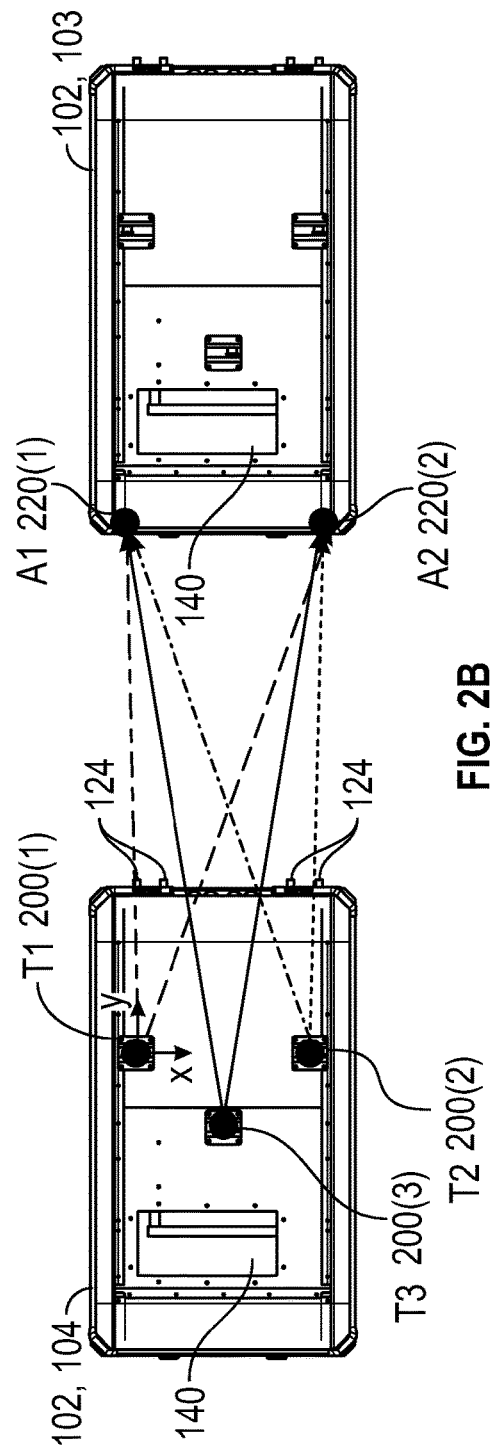
FIG. 2A
FIG. 2B

VIRTUAL E-PALLET INTERFACE

INTRODUCTION

The technical field generally relates to electric pallets, namely, devices with propulsion (e-pallets), and more specifically to the control of and interfacing with e-pallets.

Various e-pallets today are controlled via pulling by a user/operator, such as via physical touch by a human operator. However, current techniques for control of e-pallets may not be ideal under certain circumstances.

Accordingly, it is desirable to provide systems and methods for controlling of and interfacing with e-pallets. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method for controlling an e-pallet is provided that includes: obtaining, via one or more sensors of the e-pallet, sensor data as to a user of the e-pallet, a second e-pallet, or both: determining, via a processor using the sensor data, a relative position of the user, the second e-pallet or both, with respect to the e-pallet: determining, via the processor using the sensor data, a relative orientation of the user, the second e-pallet or both, with respect to the e-pallet; and taking a control action for the e-pallet, in accordance with instructions provided by the processor, based on both the relative position and the relative orientation.

Also in an exemplary embodiment: the step of obtaining the sensor data includes: obtaining, via one or more radio-based sensors, radio-based sensor data as to the user of the e-pallet, the second e-pallet, or both; and obtaining, via one or more cameras, camera data as to the user of the e-pallet, the second e-pallet, or both: the step of determining the relative position includes determining, via the processor using both the radio-based sensor data and the camera data, the relative position of the user, the second e-pallet or both, with respect to the e-pallet; and the step of determining the relative orientation includes determining, via the processor using both the radio-based sensor data and the camera data, the relative orientation of the user, the second e-pallet or both, with respect to the e-pallet.

Also in an exemplary embodiment: the step of obtaining the sensor data includes obtaining the sensor data as to the user of the e-pallet: the step of determining the relative position includes determining, via the processor using the sensor data, the relative position of the user with respect to the e-pallet: the step of determining the relative orientation includes determining, via the processor using the sensor data, the relative orientation of the user with respect to the e-pallet; and the step of taking the control action includes taking the control action for the e-pallet, in accordance with the instructions provided by the processor, based on both the relative position and the relative orientation of the user with respect to the e-pallet.

Also in an exemplary embodiment, the step of taking the control action includes selectively unlocking and locking a door of the e-pallet, in accordance with the instructions provided by the processor, based on both the relative position and the relative orientation of the user with respect to the e-pallet.

Also in an exemplary embodiment, the step of taking the control action includes controlling movement of the e-pallet by selectively engaging and disengaging a platoon mode for the e-pallet with respect to the user, in accordance with the instructions provided by the processor, based on both the relative position and the relative orientation of the user with respect to the e-pallet.

Also in an exemplary embodiment, the method further includes determining when the user of the e-pallet has fallen, via the processor, based on the relative position and the relative orientation of the user with respect to the e-pallet.

Also in an exemplary embodiment, the step of taking the control action includes disengaging a platoon mode for the e-pallet with respect to the user, in accordance with the instructions provided by the processor, when it is determined that the user has fallen.

Also in an exemplary embodiment, the method further includes: determining when a magnitude of a slope of a terrain on which the e-pallet is travelling exceeds a predetermined threshold, using the sensor data: wherein the step of taking the control action includes disengaging a platoon mode for the e-pallet, in accordance with the instructions provided by the processor, when it is determined that the magnitude of the slope of the terrain exceeds the predetermined threshold.

Also in an exemplary embodiment: the step of obtaining the sensor data includes obtaining the sensor data as to the second e-pallet: the step of determining the relative position includes determining, via the processor using the sensor data, the relative position of the second e-pallet with respect to the e-pallet: the step of determining the relative orientation includes determining, via the processor using the sensor data, the relative orientation of the second e-pallet with respect to the e-pallet; and the step of taking the control action includes selectively engaging and disengaging a platoon mode for the e-pallet with respect to the second e-pallet, in accordance with the instructions provided by the processor, based on both the relative position and the relative orientation of the second e-pallet with respect to the e-pallet.

In another exemplary embodiment, a system for controlling movement of an e-pallet includes: one or more sensors configured to obtain sensor data as to a user of the e-pallet, a second e-pallet, or both; and a processor coupled to the one or more sensors and configured to at least facilitate: determining, using the sensor data, a relative position of the user, the second e-pallet or both, with respect to the e-pallet: determining, using the sensor data, a relative orientation of the user, the second e-pallet or both, with respect to the e-pallet; and taking a control action for the e-pallet, in accordance with instructions provided by the processor, based on both the relative position and the relative orientation.

Also in an exemplary embodiment: the one or more sensors include: one or more radio-based sensors configured to obtain radio-based sensor data as to the user of the e-pallet, the second e-pallet, or both; and one or more cameras configured to obtain camera data as to the user of the e-pallet, the second e-pallet, or both; and the processor is further configured to at least facilitate: determining, using both the radio-based sensor data and the camera data, the relative position of the user, the second e-pallet or both, with respect to the e-pallet; and determining, using both the radio-based sensor data and the camera data, the relative orientation of the user, the second e-pallet or both, with respect to the e-pallet.

Also in an exemplary embodiment: the one or more sensors are configured to obtain the sensor data as to the user of the e-pallet; and the processor is further configured to at least facilitate: determining, using the sensor data, the relative position of the user with respect to the e-pallet: determining, using the sensor data, the relative orientation of the user with respect to the e-pallet; and taking the control action for the e-pallet, in accordance with the instructions provided by the processor, based on both the relative position and the relative orientation of the user with respect to the e-pallet.

Also in an exemplary embodiment, the processor is configured to at least facilitate selectively unlocking and locking a door of the e-pallet, in accordance with the instructions provided by the processor, based on both the relative position and the relative orientation of the user with respect to the e-pallet.

Also in an exemplary embodiment, the processor is configured to at least facilitate controlling movement of the e-pallet by selectively engaging and disengaging a platoon mode for the e-pallet with respect to the user, in accordance with the instructions provided by the processor, based on both the relative position and the relative orientation of the user with respect to the e-pallet.

Also in an exemplary embodiment, the processor is configured to at least facilitate determining when the user of the e-pallet has fallen based on the relative position and the relative orientation of the user with respect to the e-pallet.

Also in an exemplary embodiment, the processor is configured to at least facilitate disengaging a platoon mode for the e-pallet with respect to the user, in accordance with the instructions provided by the processor, when it is determined that the user has fallen.

Also in an exemplary embodiment, the processor is configured to at least facilitate: determining when a magnitude of a slope of a terrain on which the e-pallet is travelling exceeds a predetermined threshold, using the sensor data; and disengaging a platoon mode for the e-pallet, in accordance with the instructions provided by the processor, when it is determined that the magnitude of the slope of the terrain exceeds the predetermined threshold.

Also in an exemplary embodiment: the one or more sensors are configured to obtain the sensor data as to the second e-pallet; and the processor is configured to at least facilitate: determining, using the sensor data, the relative position of the second e-pallet with respect to the e-pallet: determining, using the sensor data, the relative orientation of the second e-pallet with respect to the e-pallet; and selectively engaging and disengaging a platoon mode for the e-pallet with respect to the second e-pallet, in accordance with the instructions provided by the processor, based on both the relative position and the relative orientation of the second e-pallet with respect to the e-pallet.

In another exemplary embodiment, an e-pallet device is provided that includes: a body: one or more radio-based sensors disposed on or within the body and configured to obtain radio-based sensor data as to a user of the e-pallet device, a second e-pallet, or both: one or more cameras disposed on or within the body and configured to camera data as to the user of the e-pallet device, the second e-pallet, or both; and a processor that is coupled to the one or more radio-based sensors and the one or more cameras, the processor configured to at least facilitate: determining, using the radio-based sensor data and the camera data, a relative position of the user, the second e-pallet or both, with respect to the e-pallet device: determining, using the radio-based sensor data and the camera data, a relative orientation of the user, the second e-pallet or both, with respect to the e-pallet device; and taking a control action for the e-pallet device, in accordance with instructions provided by the processor, based on both the relative position and the relative orientation.

In another exemplary embodiment, the processor is configured to facilitate selectively engaging and disengaging a platoon mode for the e-pallet device, based on both the relative position and the relative orientation.

DESCRIPTION OF THE DRAWINGS

The present disclosure will hereinafter be described in conjunction with the following drawing figures, wherein like numerals denote like elements, and wherein:

FIG. 2A is a functional diagram of components of the system of FIG. 1, including an e-pallet and user thereof that are in communication with one another:

FIG. 2B is a functional diagram of components of the system of FIG. 1, including two e-pallets in communication with one another:

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
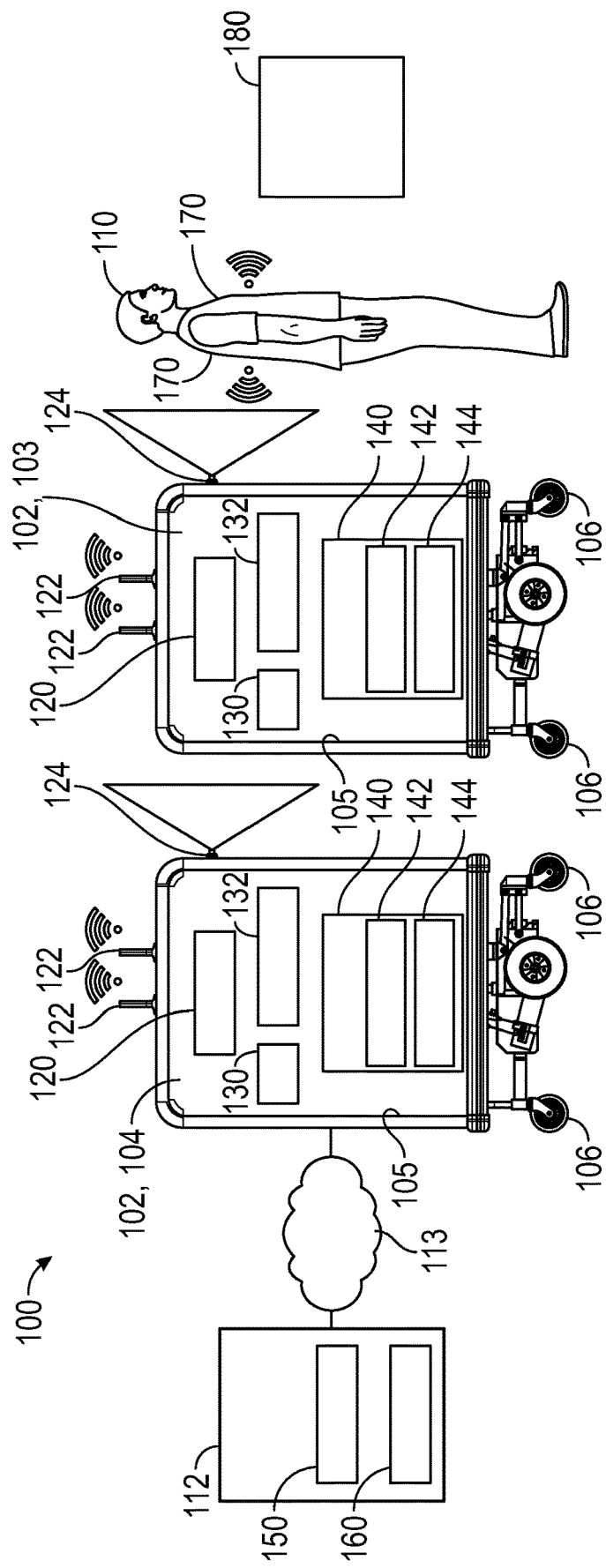
FIG. 1 is a functional diagram of a system including e-pallets and control for the e-pallets, in connection with an exemplary embodiment.

FIG. 1 illustrates a system 100 for control of electric pallets namely, devices with propulsion (e-pallets) 102, in accordance with an exemplary embodiment. While the term electric pallet and the abbreviation e-pallet are utilized herein and throughout the application, it will be appreciated that the terms "electric pallet" and "e-pallet" (as used may comprise any number of different types of pallets, carts (e.g., shopping carts, delivery carts, and/or other carts and/or similar types of apparatus), and/or any number of other types of moving platforms. In addition, while two e-pallets 102 are depicted in FIG. 1, it will be appreciated that in various embodiments the system 100 may include any number of e-pallets 102, for example a single e-pallet 102 and/or any number of multiple e-pallets 102 that are controlled in concert with one another.

As depicted in FIG. 1, in certain embodiments the system 100 may also include a user 110, a remote server 112, and a communications network 113. In certain embodiments, the system 100 may also include one or more additional components.

In the depicted embodiment, the multiple e-pallets 102 include a first e-pallet 103 and a second e-pallet 104. In various embodiments, in the configuration depicted in FIG. 1, the first e-pallet 103 may be considered a "leader" e-pallet that is in closest proximity to the user 110, and that directly follows the user 110. Also in various embodiments, in the configuration depicted in FIG. 1, the second e-pallet 104 may be considered a "follower" e-pallet that is relatively further from the user 110, and that directly follows the first e-pallet 103.

In various embodiments, the user 110 comprises an operator that interfaces with and provides one or more different types of commands for the e-pallets 102. In certain embodiments, the user 110 comprises a human being. In various embodiments, the user 110 is wearing one or more radio-based sensors (e.g., ultra-wide-band sensors) 170 that include anchors on both the front and back of the body of the user 110 (e.g., as a vest, in certain embodiments). Also in certain embodiments, the user 110 also possesses one or more electronic devices 180 (e.g., such as a smart phone, smart watch, or the like) that is configured to communicate with the e-pallets 102. In certain other embodiments, the user 110 may comprise a robot and/or other electronic device.

Also in various embodiments, the e-pallets 102 interface with the user 110 in accordance with control of the e-pallets 102 that is conducted and/or facilitated by one or more computer systems (including one or more processors) that reside in the e-pallets 102, the remote server 112, or both. As depicted in FIG. 1, in various embodiments, the e-pallets 102 communicate with the remote server 112 via one or more communications networks 113 (e.g., one or more wireless communications networks, such as via one or more cellular-based communications networks, one or more satellite-based communications networks, and/or one or more other types of wireless communications networks).

As depicted in FIG. 1, in various embodiments each e-pallet 102 includes a body 105, one or more wheels 106, a sensor array 120, a transceiver 130, one or more actuators 132, and a controller 140.

In the depicted embodiment, the body 105 substantially encloses other components of the e-pallet 102. In certain embodiments, the wheels 106 are each rotationally coupled to one or more of the axles (not depicted) near a respective corner of the body 105 to facilitate movement of the e-pallet 102. However, this may vary in different embodiments. Similarly, the number and placement of the wheels 106 may also vary in different embodiments.

In various embodiments, the sensor array 120 includes a plurality of sensors that are used for communicating with the user 110 and for the e-pallets 102 to communicate with one another. As depicted in FIG. 2, in various embodiments the sensor array 120 includes one or more radio-based sensors 122 and one or more cameras 124.

In various embodiments, the radio-based sensors 122 communicate with and obtain sensor data from the radio-based sensors 170 worn by the user 110. In certain embodiments, the radio-based sensors 122 comprise one or more ultra-wide-band (UWB) sensors. Also in various embodiments, the cameras 124 are configured to obtain vision sensor data, including as to the user 110 and the other e-pallet(s) 102.

In various embodiments, the transceiver 130 is utilized to communicate with the remote server 112, for example as to the inputs received from the user 110 and/or the implementation of commands pertaining thereto. In various embodiments, the transceiver 130 is configured to receive the user inputs and/or other data from the electronic device 180 of the user 110. In addition, in certain embodiments, the transceiver 130 is also utilized to communicate with other e-pallet(s).

Also in various embodiments, the actuators 132 are used to move the e-pallet 102. Specifically, in various embodiments, the actuators 132 are configured to cause movement of the e-pallet in one or more different directions and/or headings based on instructions provided by the controller 140 (and/or in certain embodiments from the remote server 112), for example in interpreting instructions or intent from the user 110.

In various embodiments, the controller 140 is coupled to the sensor array 120, the transceiver 130, and the actuators 132. As described in greater detail further below (in connection with FIG. 1 as well as FIGS. 2-12), in various embodiments the controller 140 utilizes sensor data, including radio sensor data (e.g., from ultra-wide-band sensors) and camera (i.e., vision) data (e.g., from cameras) in determining a relative distance and orientation between the e-pallets 102 and the user 102, for use in interfacing with the user 110 and for control of the e-pallets 102 by the user 110.

As depicted in FIG. 1, in various embodiments the controller 140 comprises a computer system that includes a processor 142 and a memory 144. In certain embodiments, the controller 140 may also include the sensor array 120, one or more of the other systems or components thereof, and/or one or more other platform components. In addition, it will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified platform devices and systems.

In various embodiments, the processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs contained within the memory 144 and, as such, controls the general operation of the controller 140 and the computer system of the controller 140, generally in executing the processes described herein, such as the processes discussed further below in connection with FIGS. 2-12.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program along with one or more stored values (e.g., including, in various embodiments, predetermined threshold values for controlling the e-pallets 102).

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

With continued reference to FIG. 1, in various embodiments the remote server 112 includes a transceiver 150 along with a controller 160 that includes a computer system, similar in structure and function to the corresponding components described above in connection with the e-pallets 102.

FIG. 2A is a functional diagram of components of the system 100 of FIG. 1, including an e-pallet 102 and user thereof 110 that are in communication with one another.

As depicted in FIG. 2A, in various embodiments the e-pallet 102 includes multiple tags 200 associated with the radio-based sensors 122 of FIG. 1. Specifically, as depicted in FIG. 2A, in various embodiments the e-pallet 102 includes three tags: namely, a first tag T1 200(1), a second tag T2 200(2), and a third tag T3 200(3). As depicted in FIG. 2B, in various embodiments the tags 200 are spaced apart on the body 105 of the e-pallet 102, namely on an upper level or roof thereof. Also in various embodiments, the tags T1 200(1), T2 200(2), and T3 300(3) are part of the radio-based sensors 122 of the e-pallet 102 (from FIG. 1), and communicate with corresponding radio-based sensor anchors.

As depicted in FIG. 2A, in various embodiments, the tags T1 200(1), T2 200(2), and T3 300(3) communicate with corresponding anchors A1 210(1) and A2 210(2) of the user 110, and that are part of the radio-based sensors 170 of the user 110. Also as depicted in FIG. 2A, in various embodiments, the anchors A1 210(1) and A2 210(2) of the user 110 are positioned at a front side and back side of the user 110, respectively (e.g., on a front and back side of a vest worn by the user 110). Accordingly, in various embodiments, the communications between the tags 200 of the e-pallet 102 and the anchors 210 of the user 110 provide information as to the relative orientation as well as the relative distance between the user 110 and the e-pallet 102. In certain embodiments, the e-pallet 102 is used in connection with a "platoon mode" with the user 110, in which the movement of the e-pallet 102 automatically follows the movement of the user 110.

With reference now to FIG. 2B, a depiction is provided of multiple e-pallets 102 in communication with one another. Specifically, as depicted in FIG. 2A, the e-pallets 102 include a first e-pallet 103 and a second e-pallet 104. In various embodiments, the first e-pallet 103 and the second e-pallet 104 both correspond to an e-pallet 102 of FIG. 1, with the components and functionality thereof. Also in various embodiments, the first and second e-pallets 103, 104 are configured to move together when in a "platoon" mode, in which one e-pallet 102 (such as the first e-pallet 103) serves as the "leader", and the other e-pallet 102 (such as the second e-pallet 104) serves as the "follower" (i.e., that directly follows the leader).

As depicted in FIG. 2B, in various embodiments the first e-pallet 103 also includes a plurality of anchors A1 220(1) and A2 220(2) that are part of the radio-based sensors 122 of the first e-pallet 103. Also as depicted in FIG. 2B, in various embodiments, the anchors A1 220(1) and A2 220(2) of the first e-pallet 103 are positioned at an end of an upper portion or roof of the first e-pallet 103, and communicate with corresponding tags T1 200(1), T2 200(2), and T3 300(3) on the roof of the second e-pallet 104. In various embodiments, this configuration facilitates the platooning of the first and second e-pallets 103, 104. In certain embodiments, the first and second e-pallets 103, 104 may both include respective anchors 220 and tags 200 such that both e-pallets 102 may server as either a leader or a follower; however, this may vary in other embodiments.

Figure 3:
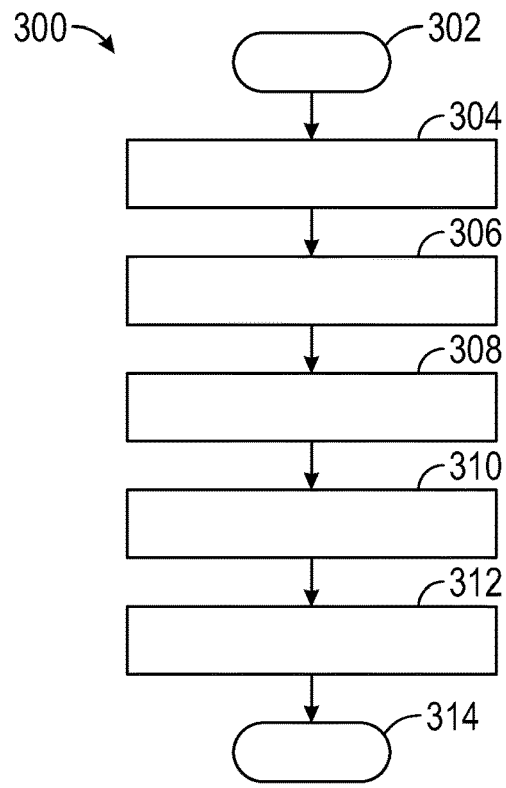
FIG. 3 is a flowchart of a process for controlling and interfacing with one or more e-pallets, and that can be incorporated in connection with the system of FIG. 1 and the components of FIGS. 2A and 2B, in accordance with an exemplary embodiment.

FIG. 3 is a flowchart of a process 300 for controlling and interfacing with one or more e-pallets, and that can be incorporated in connection with the system 100 of FIG. 1 and the components of FIGS. 2A and 2B, in accordance with an exemplary embodiment. In various embodiments, the process 300 utilizes sensor data, including radio sensor data (e.g., from ultra-wide-band sensors) and vision data (e.g., from cameras) in determining a relative distance and orientation between the e-pallets 102 and the user 110, for use in interfacing with the user 110 and for control of the e-pallets 102 by the user 110.

As depicted in FIG. 3, in various embodiments the process 300 begins at step 302. In various embodiments, the process 300 begins when one or more e-pallets 102 are operating, and/or are in proximity to a user 110.

In various embodiments, sensor data is obtained (step 304). In various embodiments, the sensor data is obtained via the sensor array 120 of FIG. 1. Specifically, in certain embodiments, radio-based sensor data is obtained via the radio-based sensors 122 of FIG. 1. In various embodiments, the radio-based sensor data comprises data received via communications between the radio-based sensors 122 (e.g., UWB sensors) of one or more e-pallets 102 with corresponding radio-based sensors 170 (e.g., UWB sensors) of the user 110 and of one or more other e-pallets 102. Also in certain embodiments, vision data is also obtained via cameras 124 of one or more of the e-pallets 102.

In various embodiments, orientation determinations are made (step 306). In various embodiments, a relative orientation (e.g., directional heading) between the e-pallet 102 and the user 110 is determined using the sensor data. In certain embodiments, a relative orientation (e.g., directional heading) between a plurality of e-pallets 102 is also determined using the sensor data. In certain embodiments, the relative orientations (between the e-pallet 102 and the user 110 and/or between respective e-pallets 102) are determined via the radio-based sensor data (e.g., using UWB and/or other radio-based sensors). In addition, in certain embodiments, the relative orientations are also confirmed (e.g., for redundancy purposes) using the vision sensor data (e.g., from the cameras).

Also in various embodiments, position determinations are made (step 308). In various embodiments, a relative position (including a relative distance) between the e-pallet 102 and the user 110 is determined using the sensor data. In certain embodiments, a relative position (and a relative distance) between a plurality of e-pallets 102 is also determined using the sensor data. In certain embodiments, the relative positions of (and distances between) the e-pallet 102 and the user 110 and/or the respective e-pallets 102) are determined via the radio-based sensor data (e.g., using UWB and/or other radio-based sensors). In addition, in certain embodiments, the relative positions (and distances) are also confirmed (e.g., for redundancy purposes) using the vision sensor data (e.g., from the cameras).

In certain embodiments, the relative positions (e.g., distance) and relative orientations (e.g., azimuth) are calculated via a processor (such as the 142 and/or a processor of the controller 160 of FIG. 1) using the sensor data in accordance with the following Equations:

$$\text{Distance} = \sqrt{\left(\frac{x_{A1} + x_{A2}}{2}\right)^2 + \left(\frac{y_{A1} + y_{A2}}{2}\right)^2}, \quad \text{(Equation 1)}$$

and Azimuth = (Equation 2)

$$\text{Tan}^{-1}\left(\frac{x_{A1} + x_{A2}}{2} - \frac{x_{T1} + x_{T2}}{2}, \frac{y_{A1} + y_{A2}}{2} - \frac{y_{T1} + y_{T2}}{2}\right),$$

in which:
T1, T2, and T3 represent three radio-based sensor tags on the follower pallet;
A1 and A2 represent two radio-based sensor tags on the user or the leader pallet;
T1A1, T1A2, T2A1, T2A2, T3A1, T3A2 represent respective distances from respective radio-based tags T1, T2, T3, and respective radio-based anchors A1, A2 (e.g., as depicted in FIGS. 2A and 2B and described above in connection therewith); and in which the respective positions with respect to the coordinate system are known based on the following:
Tag 1: $(x_{T1}, Y_{T1})$;
Tag 2: $(x_{T2}, Y_{T2})$; and
Tag 3: $(x_{T3}, Y_{T3})$; and in which the respective positions with respect to the origin are designated as follows:
Anchor A1: $(x_{A1}, Y_{A1})$;
Anchor A2: $(x_{A2}, Y_{A2})$; and the respective values of $(x_{A1}, Y_{A1})$ and $(x_{A2}, Y_{A2})$ are calculated utilizing a recursive least squares (RLS) estimation technique in accordance with the following equations:

$$(x_{T1} - x_{A1})^2 + (y_{T1} - y_{A1})^2 = T1A1^2, \quad \text{(Equation 3)}$$

$$(x_{T1} - x_{A2})^2 + (y_{T1} - y_{A2})^2 = T1A2^2, \quad \text{(Equation 4)}$$

$$(x_{T2} - x_{A1})^2 + (y_{T2} - y_{A1})^2 = T2A1^2, \quad \text{(Equation 5)}$$

$$(x_{T2} - x_{A2})^2 + (y_{T2} - y_{A2})^2 = T2A2^2, \quad \text{(Equation 6)}$$

$$(x_{T3} - x_{A1})^2 + (y_{T3} - y_{A1})^2 = T3A1^2, \quad \text{(Equation 7)}$$

$$\text{and } (x_{T3} - x_{A2})^2 + (y_{T3} - y_{A2})^2 = T3A2^2. \quad \text{(Equation 8)}$$

In addition, in various embodiments, motion determinations are made (step 310). In various embodiments, a relative motion between the e-pallet 102 and the user 110 is determined using the sensor data. In certain embodiments, a relative motion between a plurality of e-pallets 102 is also determined using the sensor data. In certain embodiments, the relative motion of the e-pallet 102 and the user 110 and/or the respective e-pallets 102 are determined via the radio-based sensor data (e.g., using UWB and/or other radio-based sensors). In addition, in certain embodiments, the relative motion is also confirmed (e.g., for redundancy purposes) using the vision sensor data (e.g., from the cameras).

In various embodiments, control of the e-pallet 102 is adjusted (step 312) In various embodiments, the relative orientations, positions, and motion of steps 306-310 are utilized for interfacing between the e-pallets 102 and the user 110 and for controlling of the e-pallets 102 via the user 110 and also in relation between the e-pallets 102. In various embodiments, the e-pallets 102 are physically moved in accordance with instructions provided by the user 110 and/or the processor 142 (and/or a processor of the controller 160 of FIG. 1) based at least in part on these determinations. In addition, in certain embodiments, different modes of operation and movement (including selective engagement and disengagement of platooning, locking and unlocking of doors of the e-pallets 102, detected a fall of a user 110, and detecting and adjusting to extreme terrain change) are implemented based at least in part on these determinations (e.g., as depicted in FIGS. 4-12 and described below in connection therewith). In various embodiments, the process then ends at step 314.

Figure 4:
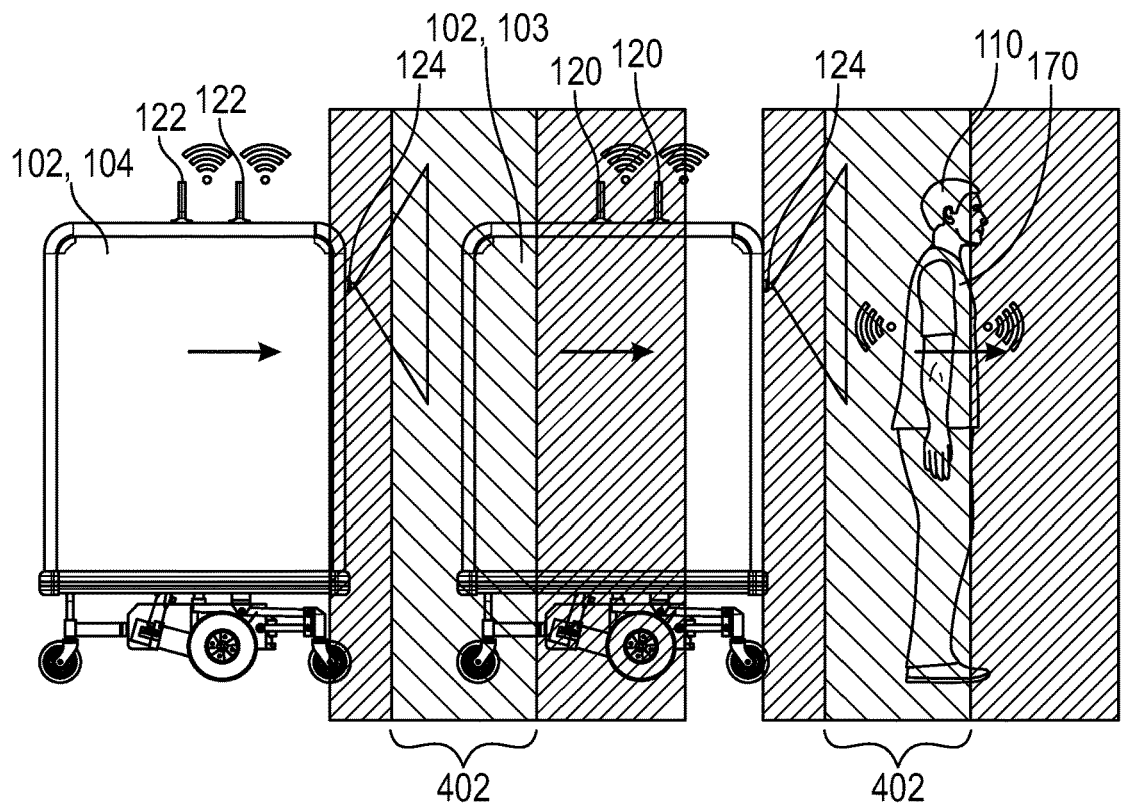
FIGS. 4 and 5 depict an exemplary implementation of the process of FIG. 3 (in both a functional diagram and a flowchart), in which multiple e-pallets are controlled by a user, and in which platooning of the e-pallets is engaged and disengaged, in accordance with an exemplary embodiment.
Figure 5:
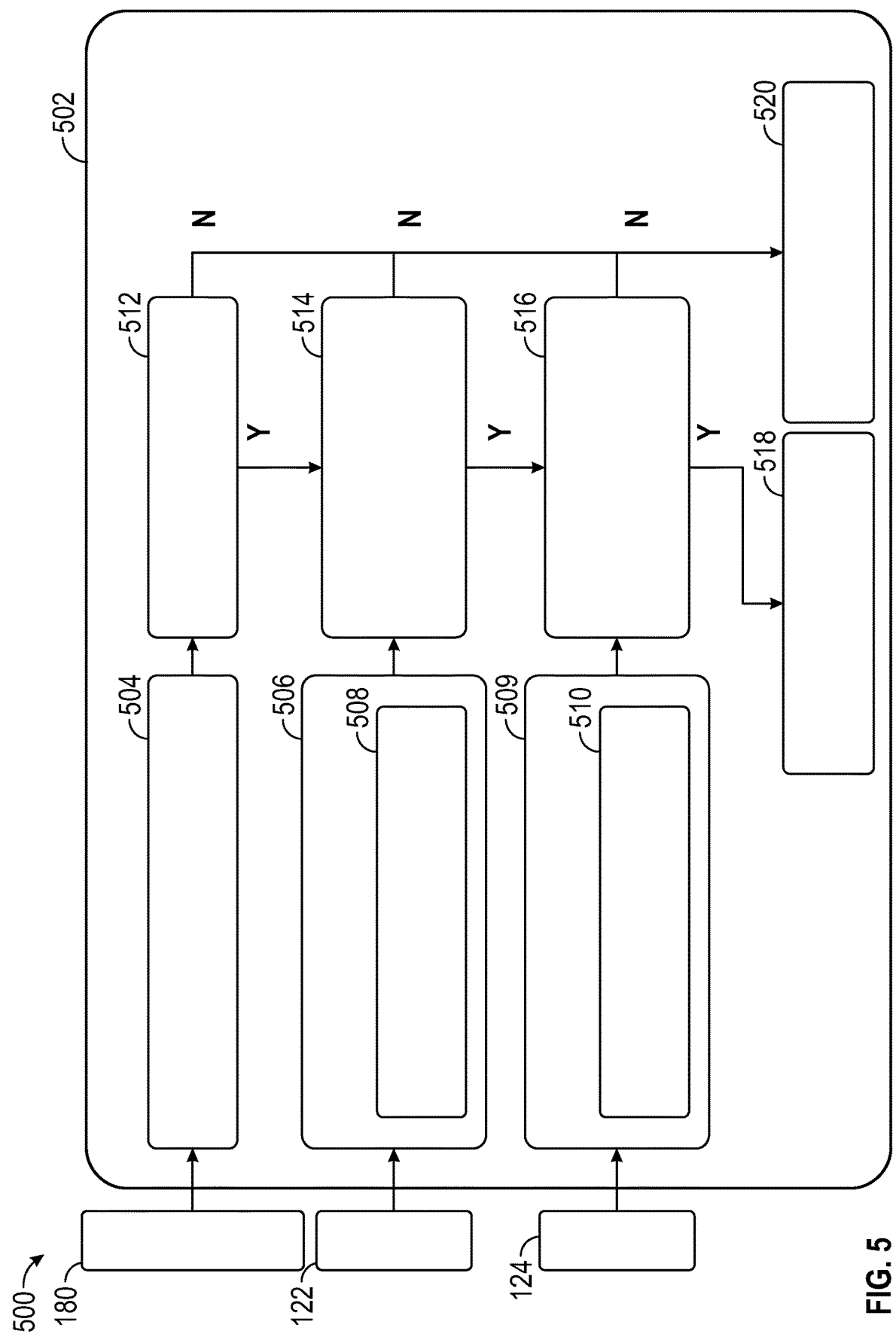

FIGS. 4 and 5 depict an exemplary implementation of the process 300 of FIG. 3 (in both a functional diagram and a flowchart), in which multiple e-pallets 102 are controlled by a user 110, and in which platooning of the e-pallet 102 is engaged and disengaged, in accordance with an exemplary embodiment.

With reference to FIG. 4, an illustration is provided of such a platooning mode for the e-pallets 102. As depicted in FIG. 4, control of the first e-pallet 103 (i.e., the "leader" pallet) is based on the relative distance, orientation, and movement of the first e-pallet 103 and the user 110. Also as depicted in FIG. 4, control of the second e-pallet 104 (i.e., the "follower" pallet) is based on the distance, orientation, and movement of the first e-pallet 103 when the first and second e-pallets 103, are operating in the platooning mode. Also in various embodiments as depicted in FIG. 4, the pairing of the first pallet 103 and the user 110, and of the second e-pallet 104 and the first pallet 103, are accomplished in respective safe zones 402 in which the pairing can be properly initiated.

With reference to FIG. 5, a flowchart is provided for a process 500 corresponding to the implementation of FIG. 4. As depicted in FIG. 5, data is obtained from each of the electronic device 180 (e.g., smart phone, smart watch, or other mobile device), the radio-based sensors 122 (e.g., UWB sensors), and cameras 124 of FIG. 1. In various embodiments, the data is utilized as part of an algorithm 502 for selectively engaging and disengaging of platooning of the e-pallets 102.

As depicted in FIG. 5, in various embodiments, an operating mode is obtained (step 504). In various embodiments, the operating mode is obtained by a processor (such as the processor 142 and/or controller 160 of FIG. 1) from the electronic device 180 of the user 110 of FIG. 1. Also in various embodiments, the operating mode comprises a selection by the user 110 as to whether or not the platooning mode is selected for the e-pallets 102.

Also in various embodiments, radio-based sensor signal processing is performed (step 506). In various embodiments, radio-based sensor signal processing (e.g. UWB signal processing) is performed by a processor (such as the processor 142 and/or controller 160 of FIG. 1) based on signals provided by the radio-based sensors 122 (e.g., UWB sensors). Also in various embodiments, the radio-based sensor signal processing includes leader detection, localization, and orientation (step 508).

In addition, in various embodiments, camera signal processing is performed (step 509). In various embodiments, camera signal processing is performed by a processor (such as the processor 142 and/or controller 160 of FIG. 1) based on camera signals provided by the one or more cameras 124. Also in various embodiments, the camera signal processing includes leader detection, localization, and orientation (step 510).

In various embodiments, a determination is made as to whether the platooning mode for the e-pallets 102 is enabled (step 512). In various embodiments, this determination is made by a processor (such as the processor 142 and/or controller 160 of FIG. 1) based on the operating mode of step 504.

In various embodiments, if it is determined in step 512 that the platooning mode is not enabled, then the process proceeds to step 520, in which platooning is disengaged for the pallets. In certain embodiments, the process then terminates, and/or repeats in a new iteration with new and/or updated sensor data.

Conversely, in various embodiments, if it is instead determined in step 512 that the platooning mode is enabled, then the process proceeds instead to step 514. In various embodiments, during step 514, a determination is made as to whether the user and e-pallets are located within a safe zone. Specifically, in various embodiments, during step 514, a determination is made as to whether respective safe zones 402 of FIG. 4 are present between both (i) the user 110 and the first e-pallet 103 and (ii) the first e-pallet 103 and the second e-pallet 104. In various embodiments, these determinations are made by a processor (such as the processor 142 and/or controller 160 of FIG. 1) based on the radio-based signal processing (e.g., UWB signal processing) of step 506.

In various embodiments, if it is determined in step 514 that the user and e-pallets are not within safe zones, then the process proceeds to step 520, in which platooning is disengaged for the pallets. In certain embodiments, the process then terminates, and/or repeats in a new iteration with new and/or updated sensor data.

Conversely, in various embodiments, if it is instead determined in step 514 that the user and the e-pallets are within safe zones, then the process proceeds instead to step 516. In various embodiments, during step 516, determinations are made as to whether the user is detected and the user heading is within a calibrated range. In various embodiments, these determinations are made by a processor (such as the processor 142 and/or controller 160 of FIG. 1) based on the camera signal processing of step 509.

In various embodiments, if it is determined in step 516 that the user is not detected, or that the user heading is not within a calibrated range, or both, then the process proceeds to step 520, in which platooning is disengaged for the pallets. In certain embodiments, the process then terminates, and/or repeats in a new iteration with new and/or updated sensor data.

Conversely, in various embodiments, if it is instead determined in step 516 that both the user is detected and the user heading is within a calibrated range, then the process proceeds instead to step 518. In various embodiments, during step 518, platooning is engaged for the e-pallets. In various embodiments, the e-pallets are controlled accordingly in a platooning fashion (e.g., in which the first e-pallet 103 follows the user 110 and the second e-pallet 104 follows the first e-pallet 103). In various embodiments, the platooning is continued until the determinations of steps 512, 514, and/or 516 change (e.g. with updated sensor data), and/or until the process terminates.

Figure 6:
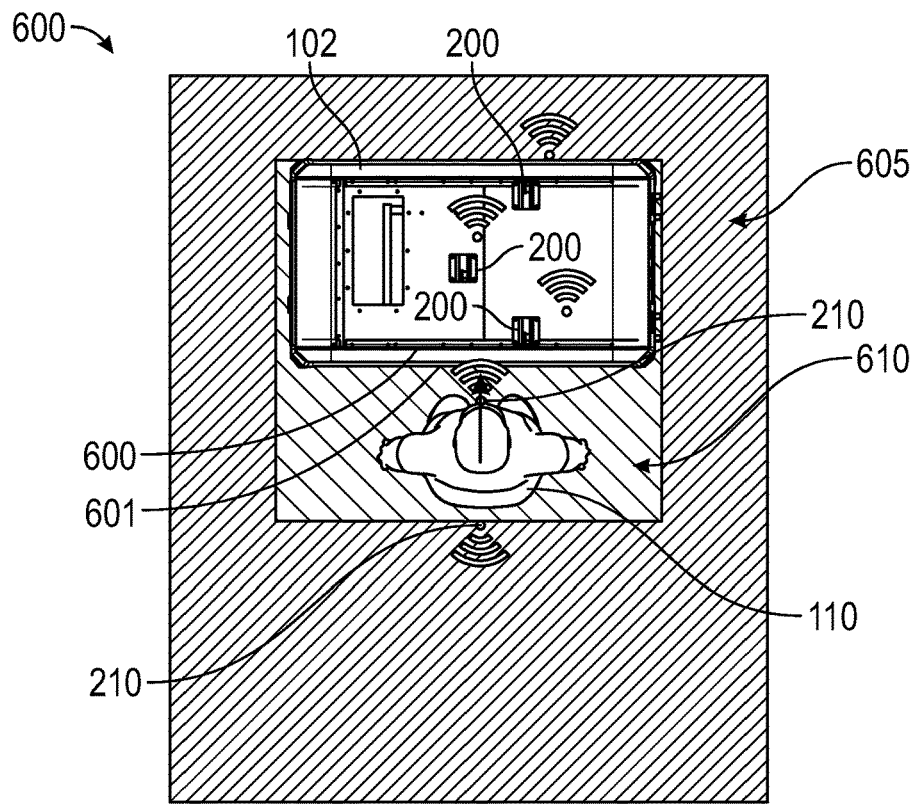
FIGS. 6-8 depict another exemplary implementation of the process of FIG. 3 (in both functional diagrams and a flowchart), in which doors of an e-pallet are locked and unlocked for the user, in accordance with an exemplary embodiment.
Figure 7:
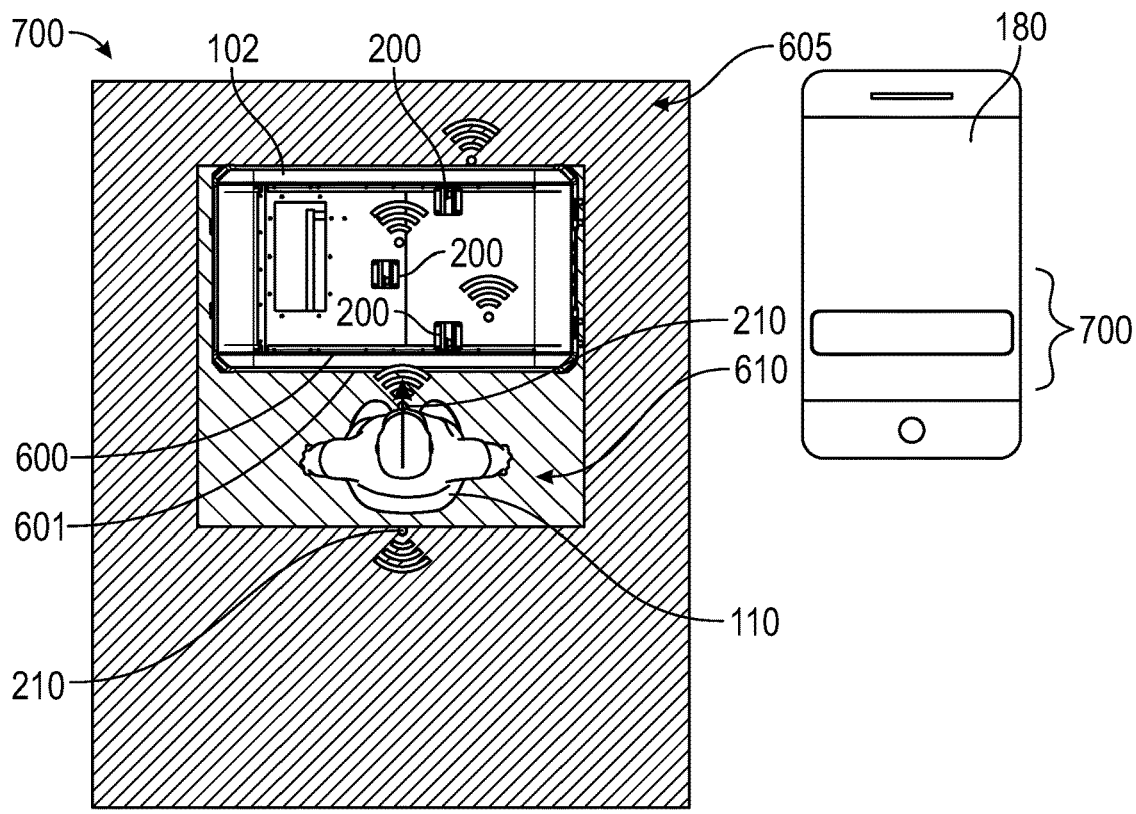
Figure 8:
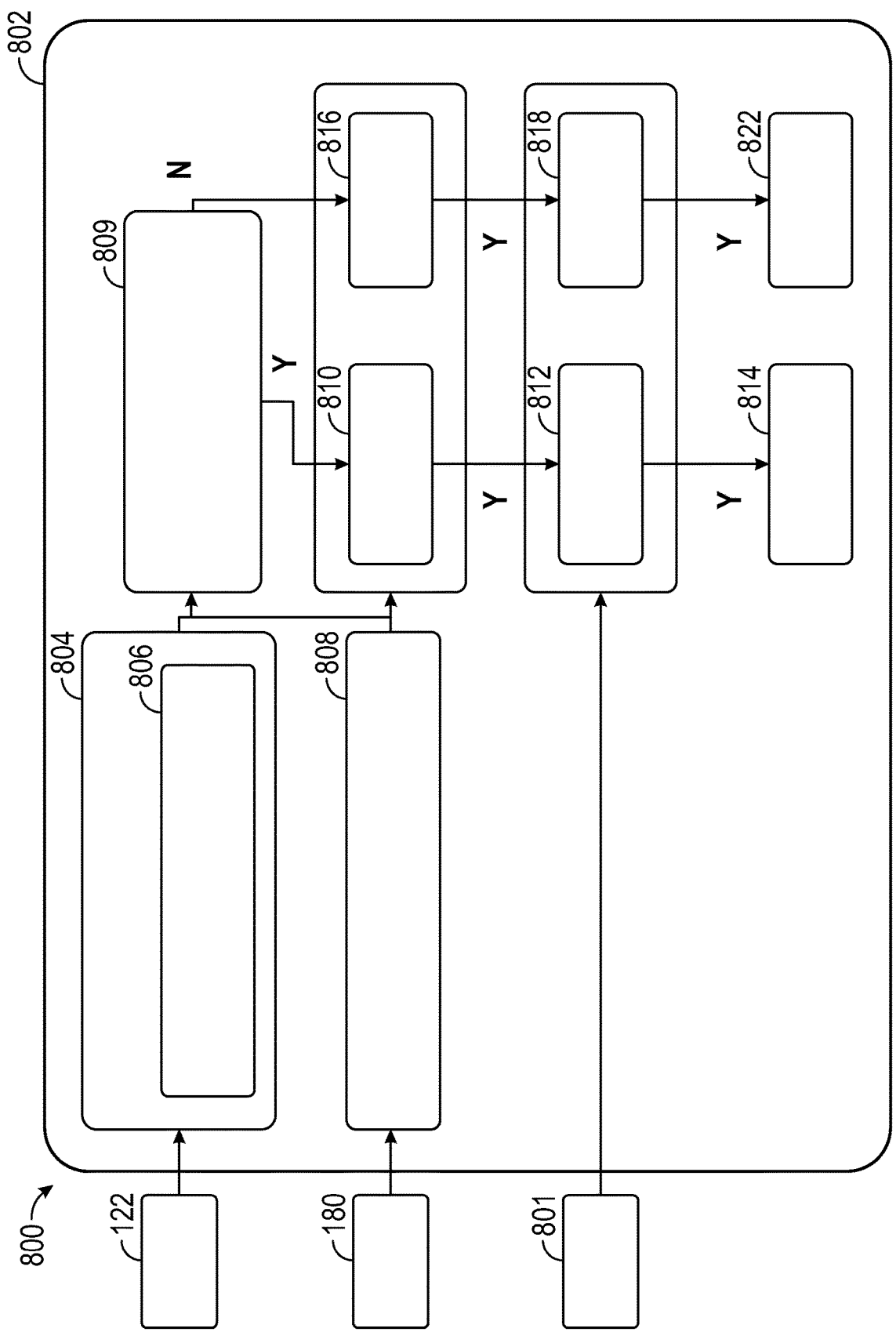

FIGS. 6-8 depict another exemplary implementation of the process 300 of FIG. 3 (in both functional diagrams and a flowchart), in which doors of an e-pallet 102 are locked and unlocked for the user 110, in accordance with an exemplary embodiment.

With reference to FIGS. 6 and 7, illustrations are provided of such a locking and unlocking for the e-pallets 102. As depicted in FIGS. 6 and 7, in various embodiments a door 600 of the e-pallet 102 is automatically unlocked when the user 110 is in an unlocked door zone 610 and is facing the door 600. Conversely, also depicted in FIGS. 6 and 7, in various embodiments the door 600 remains locked when the user 110 is in a locked door zone 605. In addition, in various embodiments, the door 600 remains locked when the user 110 is not facing the door 600, regardless of the location of the user 110. In various embodiments, the door 600 includes a sensor 601 configured to obtain sensor data as to whether the door 600 is locked or unlocked.

In various embodiments, the size of the unlocked door zone 610, the locked door zone 605, the user heading requirements, and any lock/unlock delay timers are all calibratable values that can change based on the particular mode of operation of the e-pallet 102 (e.g., "depot mode" versus "delivery mode"), for example as selected by the user 110 via the electronic device 180 of the user 110. For example, with respect to FIG. 7, in various embodiments the user 110 may select from various modes of operation and/or calibrations via the electronic device 180, such as a selecting from a depot mode, a delivery mode, a grocery mode, and/or one or more other modes of operation and/or calibrations pertaining thereto.

With reference to FIG. 8, a flowchart is provided for a process 800 corresponding to the implementation of FIGS. 6 and 7. As depicted in FIG. 8, data is obtained from the radio-based sensors 122 (e.g., UWB sensors) and the electronic device 180 (e.g., smart phone, smart watch, or other mobile device), as well as data as to the door lock status 801 (e.g., from the door lock sensor 601 of FIGS. 6 and 7). In various embodiments, the data is utilized as part of an algorithm 802 for selectively unlocking the door 600 of the e-pallet 102.

As depicted in FIG. 8, in various embodiments, radio-based sensor signal processing is performed (step 804). In various embodiments, radio-based sensor signal processing (e.g. UWB signal processing) is performed by a processor (such as the processor 142 and/or controller 160 of FIG. 1) based on signals provided by the radio-based sensors 122 (e.g., UWB sensors). Also in various embodiments, the radio-based sensor signal processing includes leader detection, localization, and orientation (step 806).

Also as depicted in FIG. 8, in various embodiments, an operating mode is obtained (step 808). In various embodiments, the operating mode is obtained by a processor (such as the processor 142 and/or controller 160 of FIG. 1) from the electronic device 180 of the user 110 of FIG. 1. Also in various embodiments, the operating mode comprises a selection by the user 110 as to whether or not the platooning mode is selected for the e-pallet 102.

In various embodiments, during step 809, a determination is made as to whether the user 110 is located in the unlocked door zone 610 and the user is facing the door 600 (step 809). In various embodiments, this determination is made as to whether the user 110 is located in the unlocked door zone 610 and the user heading with respect to the door 600 is within a calibrated range. In various embodiments, these determinations are made by a processor (such as the processor 142 and/or controller 160 of FIG. 1) based on the radio-based signal processing (e.g., UWB signal processing) of step 804.

In various embodiments, if it is determined in step 809 that both the user 110 is located in the unlocked door zone 610 and the user is facing the door 600, then the process proceeds to step 810, described below. Conversely, if it is instead determined that the user 110 is not located in the unlocked door zone 610, or that the user is not facing the door 600, or both, then the process instead proceeds to step 816, described further below.

During step 810, a determination is made as to whether an unlocked door time limit has been reached. In various embodiments, this determination is made by a processor (such as the processor 142 and/or controller 160 of FIG. 1) based on the radio-based signal processing (e.g., UWB signal processing) of step 804 and the operating mode of step 808.

In various embodiments, if it is determined during step 810 that the unlocked door time limit has been reached, then the process proceeds to step 812, described below. Conversely, if it is instead determined in 810 that the unlocked door time limit has not been reached, then no further action is taken to unlock the door at this time, and the process then continues in a new iteration with updated sensor data or terminates.

During step 812, a determination is made as to whether the door 600 is locked. In various embodiments, this determination is made by a processor (such as the processor 142 and/or controller 160 of FIG. 1) based on the door lock status 801 (e.g., based on sensor data from the lock sensor 601 of FIGS. 6 and 7).

In various embodiments, if it is determined during step 812 that the door 600 is locked, then the door 600 is unlocked (step 814). In various embodiments, this is performed in accordance with instructions provided by a processor (such as the processor 142 and/or controller 160 of FIG. 1) to the door 600 (and/or a lock thereof). In various embodiments, the process then continues in a new iteration with updated sensor data or terminates. Conversely, if it is instead determined in 812 that the door 600 is already unlocked, then no further action is taken to unlock the door, and the process then continues in a new iteration with updated sensor data or terminates.

With reference back to step 809, if it is instead determined that the user 110 is not located in the unlocked door zone 610, or that the user not facing the door 600, or both, then the process instead proceeds to step 816. In various embodiments, during step 816, a determination is made as to whether a locked door time limit has been reached. In various embodiments, this determination is made by a processor (such as the processor 142 and/or controller 160 of FIG. 1) based on the radio-based signal processing (e.g., UWB signal processing) of step 804 and the operating mode of step 808.

In various embodiments, if it is determined during step 816 that the locked door time limit has been reached, then the process proceeds to step 818, described below. Conversely, if it is instead determined in 816 that the locked door time limit has not been reached, then no further action is taken to lock the door at this time, and the process then continues in a new iteration with updated sensor data or terminates.

During step 818, a determination is made as to whether the door 600 is locked. In various embodiments, this determination is made by a processor (such as the processor 142 and/or controller 160 of FIG. 1) based on the door lock status 801 (e.g., based on sensor data from the lock sensor 601 of FIGS. 6 and 7).

In various embodiments, if it is determined during step 818 that the door 600 is unlocked, then the door 600 is locked (step 822). In various embodiments, this is performed in accordance with instructions provided by a processor (such as the processor 142 and/or controller 160 of FIG. 1) to the door 600 (and/or a lock thereof). In various embodiments, the process then continues in a new iteration with updated sensor data or terminates. Conversely, if it is instead determined in 818 that the door 600 is already locked, then no further action is taken to unlock the door, and the process then continues in a new iteration with updated sensor data or terminates.

Figure 9:
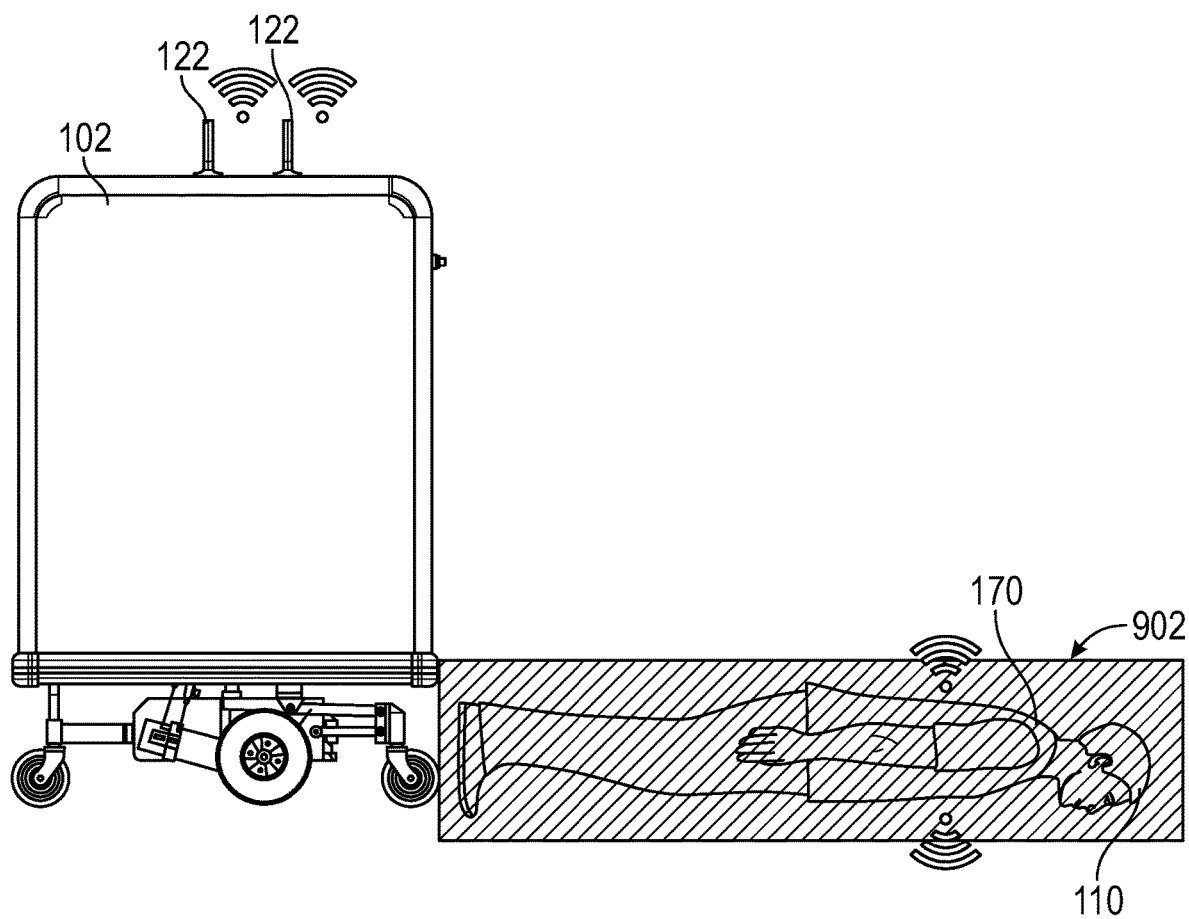
FIGS. 9 and 10 depict another exemplary implementation of the process of FIG. 3 (in both a functional diagram and a flowchart), in which an operator fall is detected, in accordance with an exemplary embodiment.
Figure 10:
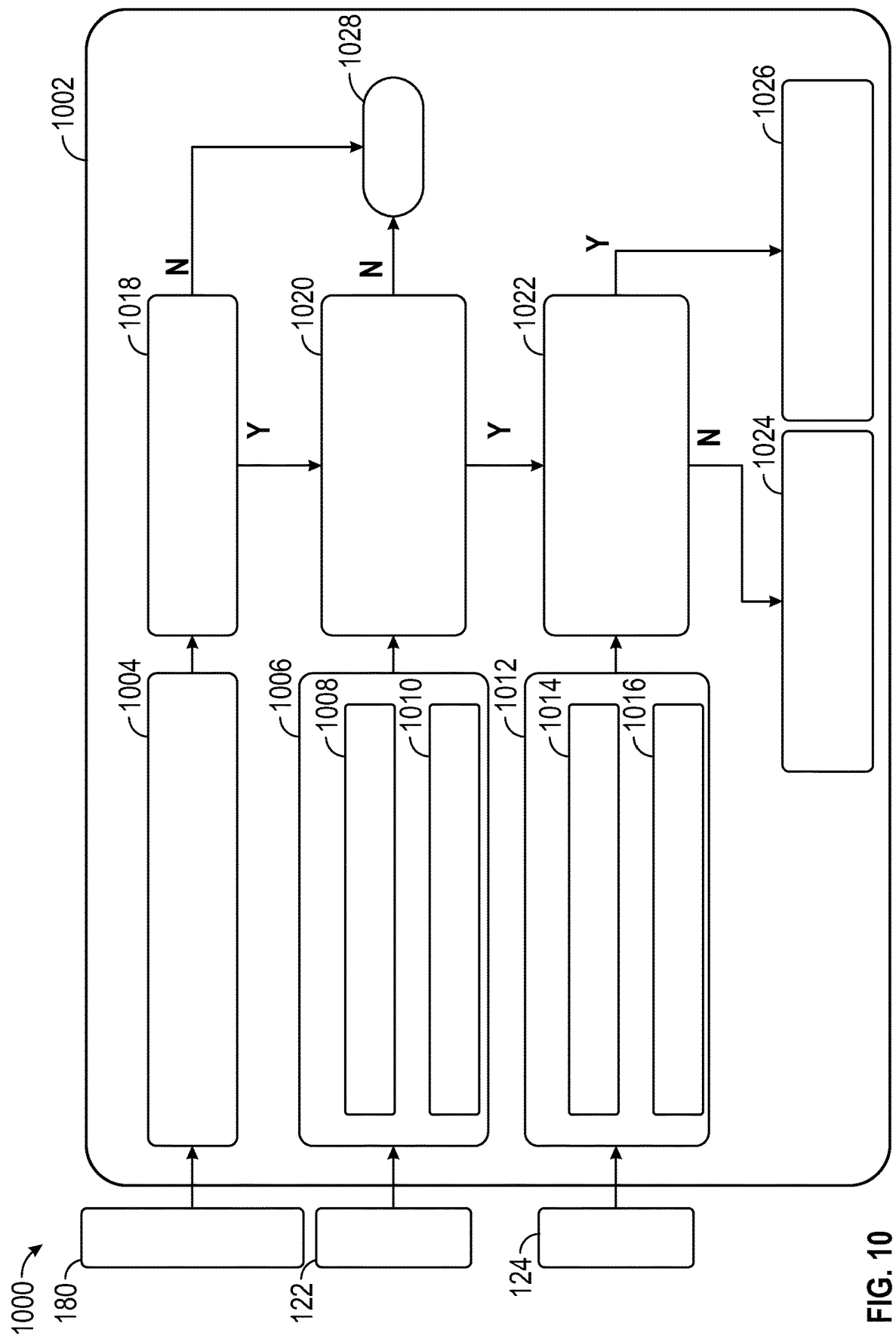

FIGS. 9 and 10 depict another exemplary implementation of the process 300 of FIG. 3 (in both functional diagrams and a flowchart), in which a user fall is detected, in accordance with an exemplary embodiment.

With reference to FIG. 9, an illustration is provided of fall detection for a user 110 of an e-pallet 102. As depicted in FIG. 9, in this mode of operation, the e-pallet 102 detects when a user 110 has fallen. In various embodiments, the user 110 is determined to have fallen, for example, when the user 110 has assumed a position in a zone 902 that reflects a likely fall, such as when the user 110 is very low to the ground and/or when a sudden change in the elevation and heading of the user 110 has occurred.

With reference to FIG. 10, a flowchart is provided for a process 1000 corresponding to the implementation of FIG. 9. As depicted in FIG. 10, data is obtained from each of the electronic device 180 (e.g., smart phone, smart watch, or other mobile device), the radio-based sensors 122 (e.g., UWB sensors), and cameras 124 of FIG. 1. In various embodiments, the data is utilized as part of an algorithm 1002 for detecting a fall of the user 110.

As depicted in FIG. 100, in various embodiments, an operating mode is obtained (step 1004). In various embodiments, the operating mode is obtained by a processor (such as the processor 142 and/or controller 160 of FIG. 1) from the electronic device 180 of the user 110 of FIG. 1. Also in various embodiments, the operating mode comprises a selection by the user 110 as to whether or not the platooning mode is selected between the e-pallet 102 and the user 110.

Also in various embodiments, radio-based sensor signal processing is performed (step 1006). In various embodiments, radio-based sensor signal processing (e.g. UWB signal processing) is performed by a processor (such as the processor 142 and/or controller 160 of FIG. 1) based on signals provided by the radio-based sensors 122 (e.g., UWB sensors). Also in various embodiments, the radio-based sensor signal processing includes detection, localization, and orientation of the user 110 relative to the e-pallet 102 (step 1008), as well as a pitch (e.g., heading) of the user 110 relative to the e-pallet 102 (step 1010).

In addition, in various embodiments, camera signal processing is performed (step 1012). In various embodiments, camera signal processing is performed by a processor (such as the processor 142 and/or controller 160 of FIG. 1) based on camera signals provided by the one or more cameras 124. Also in various embodiments, the camera signal processing includes detection of the user 110 (step 1014) and a determination of a pitch (e.g., heading) of the user 110 relative to the e-pallet 102 (step 1016).

In various embodiments, a determination is made as to whether the platooning mode is enabled (step 1018). In various embodiments, this determination is made by a processor (such as the processor 142 and/or controller 160 of FIG. 1) based on the operating mode of step 1004.

In various embodiments, if it is determined in step 1018 that the platooning mode is not enabled, then the process terminates (step 1028).

Conversely, in various embodiments, if it is instead determined in step 1018 that the platooning mode is enabled, then the process proceeds instead to step 1020. In various embodiments, during step 1020, a determination is made as to whether a location of the user 110 is below a predetermined threshold (e.g., such that the user 110 is too low), a heading of the user 110 is outside an acceptable (or typical) range, or both. In various embodiments, these determinations are made by a processor (such as the processor 142 and/or controller 160 of FIG. 1) based on the radio-based signal processing (e.g., UWB signal processing) of step 1006.

In various embodiments, if it is determined in step 1020 that both the location of the user 110 is below a predetermined threshold (e.g., such that the user 110 is too low) and that the user 110 is outside an acceptable (or typical) range, then the process proceeds to step 1022, described below. Conversely, in various embodiments, if it is instead determined in step 1020 that either the location of the user 110 is below a predetermined threshold (e.g., such that the user 110 is too low), or that the user 110 is outside an acceptable (or typical) range, or both, then the process terminates at step 1028.

During step 1022, in various embodiments, a determination is made as to whether a position of the user 110 is within an acceptable or normal range (e.g., a position of the user 110 with respect to the ground). In various embodiments, this determination is made by a processor (such as the processor 142 and/or controller 160 of FIG. 1) based on the camera signal processing of step 1012.

In various embodiments, if it is determined in step 1022 that both the position of the user 110 is not within an acceptable or normal range (e.g., if the user 110 is too close to the ground), then the process proceeds to step 1024. During step 1024, a fall is determined to have occurred for the user 110. In various embodiments, the e-pallet 102 automatically takes appropriate action, such as immediately stopping movement, and/or sounding a notification or alarm. In various embodiments, such actions are performed or facilitate by a processor (such as the processor 142 and/or controller 160 of FIG. 1). In certain embodiments, the process may then repeat with updated data or terminate.

Conversely, if it is instead determined in step 1022 that the position of the user 110 is within an acceptable or normal range (e.g., if the user 110 is not too close to the ground), then the process proceeds instead to step 1026. During step 1026, it is determined that the user 110 is not wearing his or her sensors (e.g., his or her UWB sensors). In various embodiments, the e-pallet 102 automatically takes appropriate action, such as sounding a notification or alarm. In various embodiments, such actions are performed or facilitate by a processor (such as the processor 142 and/or controller 160 of FIG. 1). In certain embodiments, the process may then repeat with updated data or terminate.

Figure 11:
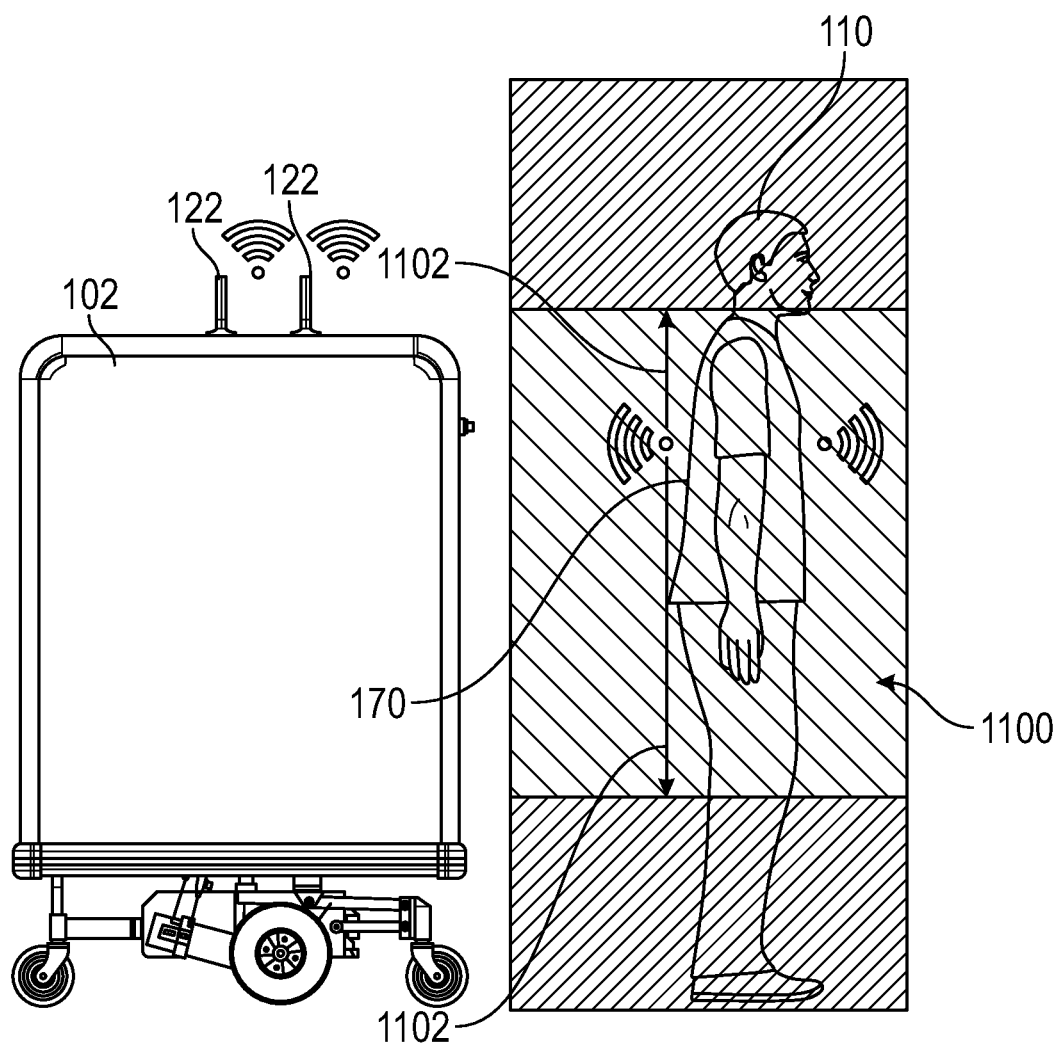
FIGS. 11 and 12 depict another exemplary implementation of the process of FIG. 3 (in both a functional diagram and a flowchart), in which extreme terrain change is detected, in accordance with an exemplary embodiment.
Figure 12:
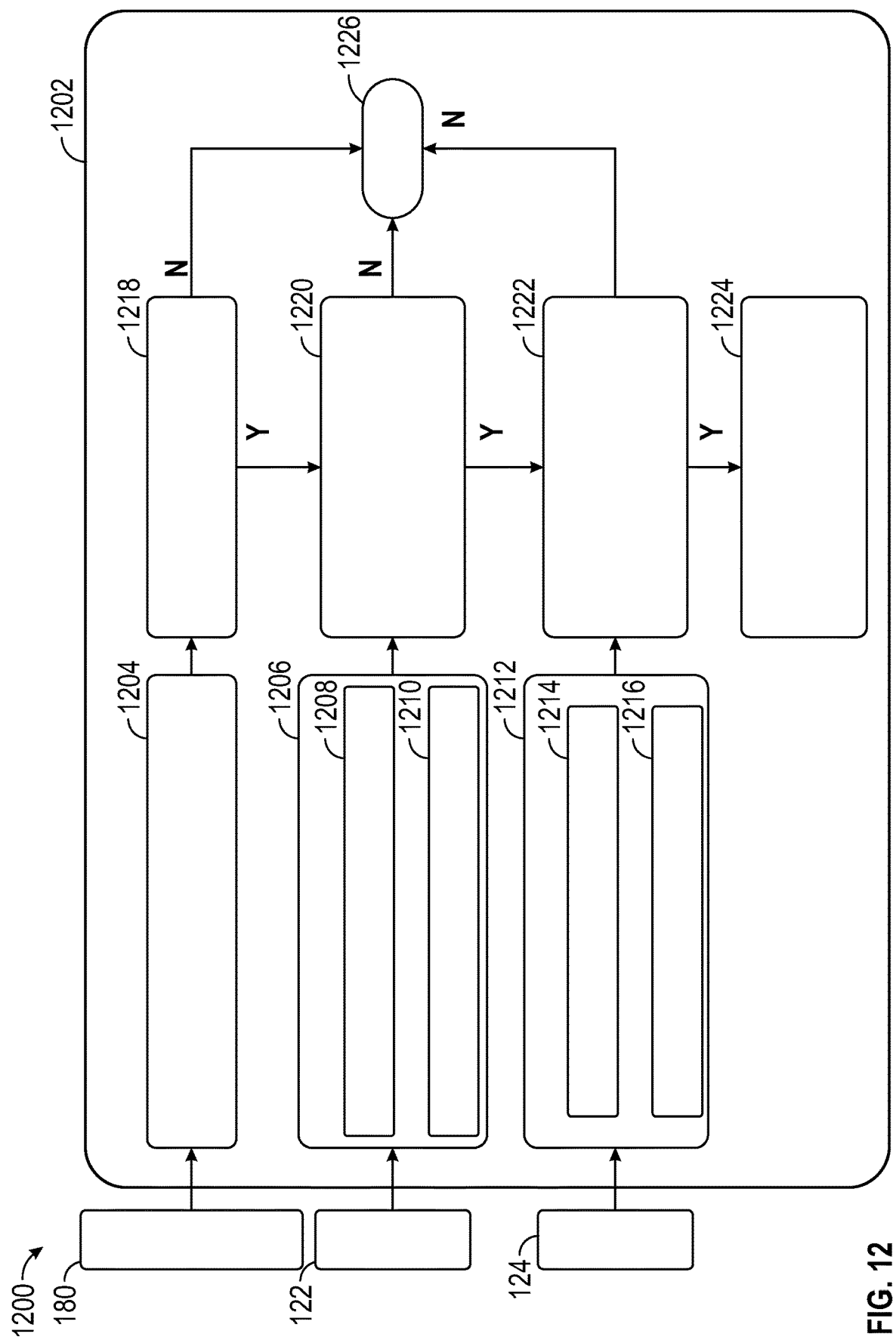

FIGS. 11 and 12 depict another exemplary implementation of the process 300 of FIG. 3 (in both functional diagrams and a flowchart), in which extreme terrain change is detected, in accordance with an exemplary embodiment.

With reference to FIG. 11, an illustration is provided with respect to the detection of terrain change. In certain embodiments, as used herein, an extreme change in terrain includes a change of the slope (up or down) of the terrain with a magnitude that is greater than a predetermined threshold such that it would be difficult for the e-pallet to follow if the ascent or descent is too steep. As depicted in FIG. 11, in this mode of operation, extreme terrain change may be determined when the user 110 is outside of an expected or acceptable position range 1100. In various embodiments, the e-pallet 102 utilizes dual radio-based sensors 122 (e.g., UWB sensors) for obtaining sensor data as to the relative height between the e-pallet 102 and the user 110. In various embodiments, if the radio-based sensors 122 detect a sudden change in elevation, and the camera 124 detects the user 1110 in an expected position (e.g., in front of the e-pallet 102) but the elevation change of the user 110 is consistent with the operator moving up or down a step, or traversing slope that is beyond the capability of the e-pallet 102, the platoon will stop to prevent a potential situation in which the e-pallet 102 may fall over or get stuck.

With reference to FIG. 12, a flowchart is provided for a process 1200 corresponding to the implementation of FIG. 11. As depicted in FIG. 12, data is obtained from each of the electronic device 180 (e.g., smart phone, smart watch, or other mobile device), the radio-based sensors 122 (e.g., UWB sensors), and cameras 124 of FIG. 1. In various embodiments, the data is utilized as part of an algorithm 1202 for detecting a fall of the user 110.

As depicted in FIG. 100, in various embodiments, an operating mode is obtained (step 1204). In various embodiments, the operating mode is obtained by a processor (such as the processor 142 and/or controller 160 of FIG. 1) from the electronic device 180 of the user 110 of FIG. 1. Also in various embodiments, the operating mode comprises a selection by the user 110 as to whether or not the platooning mode is selected between the e-pallet 102 and the user 110.

Also in various embodiments, radio-based sensor signal processing is performed (step 1206). In various embodiments, radio-based sensor signal processing (e.g. UWB signal processing) is performed by a processor (such as the processor 142 and/or controller 160 of FIG. 1) based on signals provided by the radio-based sensors 122 (e.g., UWB sensors). Also in various embodiments, the radio-based sensor signal processing includes determining a relative distance between the user 110 and the e-pallet 102 (step 1208) as well as determining a user heading and elevation relative to the e-pallet 102 (step 1210).

In addition, in various embodiments, camera signal processing is performed (step 1212). In various embodiments, camera signal processing is performed by a processor (such as the processor 142 and/or controller 160 of FIG. 1) based on camera signals provided by the one or more cameras 124. Also in various embodiments, the camera signal processing includes detection of the user 110 (step 1214) and a determination of an elevation of the user 110 relative to the e-pallet 102 (step 1216).

In various embodiments, a determination is made as to whether the platooning mode for the e-pallet 102 is enabled (step 1218). In various embodiments, this determination is made by a processor (such as the processor 142 and/or controller 160 of FIG. 1) based on the operating mode of step 1004.

In various embodiments, if it is determined in step 1218 that the platooning mode is not enabled, then the process terminates (step 1226).

Conversely, in various embodiments, if it is instead determined in step 1218 that the platooning mode is enabled, then the process proceeds instead to step 1220. In various embodiments, during step 1220, determinations are made as to whether a location of the user 110 is below or above respective predetermined thresholds (e.g., such that it would make it too difficult for the e-pallet 102 to follow) with a normal or acceptable heading for the user 110.

In various embodiments, if it is determined in step 1220 that both of the conditions are satisfied (namely, that the location of the user 110 is below or above the respective predetermined thresholds and the heading is in a normal range), then it is determined that the user 110 is in a normal or acceptable position (step 1222) and that extreme terrain changes are detected (step 1224). In various embodiments, the e-pallet 102 automatically takes appropriate action, such as immediately slowing down movement, and/or sounding a notification or alarm. In various embodiments, such actions are performed or facilitate by a processor (such as the processor 142 and/or controller 160 of FIG. 1).

Conversely, in various embodiments, when it is determined that either of the conditions of step 1220, or both, are not satisfied, the process then terminates at step 1226.

Accordingly, methods, and systems are provided for interfacing with and control of e-pallets (and/or for interfacing with or control of one or more other types of moving platforms). As described in greater detail above, in various embodiments, the disclosed methods and systems utilize sensor data, including radio sensor data (e.g., from ultra-wide-band sensors) and vision data (e.g., from cameras) in determining a relative distance and orientation between the e-pallets and the user, for use in interfacing with the user 110 and for control of the e-pallets 102 by the user 110.

It will be appreciated that the systems, methods, and implementations may vary from those depicted in the Figures and described herein. For example, in various embodiments, the system 100 (e.g., including the e-pallets 102, the user 110, the communications network 113, and/or the remote server 112), components thereof, and/or other components may differ from those depicted in FIG. 1 and/or described above in connection therewith. It will also be appreciated that the implementations of FIGS. 2-12 may vary, and also that various steps thereof may be performed simultaneously and/or in a different order, than those depicted in the Figures and/or described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling an e-pallet, the method comprising:
obtaining, via one or more sensors of the e-pallet, sensor data as to a user of the e-pallet;
determining, via a processor using the sensor data, a relative position of the user with respect to the e-pallet;
determining, via the processor using the sensor data, a relative orientation of the user with respect to the e-pallet;
taking a control action for the e-pallet, in accordance with instructions provided by the processor, based on both the relative position and the relative orientation of the user with respect to the e-pallet; and
determining when the user of the e-pallet has fallen, via the processor, based on the relative position and the relative orientation of the user with respect to the e-pallet.

2. The method of claim 1, wherein:
the obtaining the sensor data comprises:
obtaining, via one or more radio-based sensors, radio-based sensor data as to the user of the e-pallet; and
obtaining, via one or more cameras, camera data as to the user of the e-pallet;
the determining the relative position comprises determining, via the processor using both the radio-based sensor data and the camera data, the relative position of the user with respect to the e-pallet; and
the determining the relative orientation comprises determining, via the processor using both the radio-based sensor data and the camera data, the relative orientation of the user with respect to the e-pallet.

3. The method of claim 1, wherein the taking the control action further comprises:
selectively unlocking and locking a door of the e-pallet, in accordance with the instructions provided by the processor, based on both the relative position and the relative orientation of the user with respect to the e-pallet.

4. The method of claim 1, wherein of taking the control action further comprises:
controlling movement of the e-pallet by selectively engaging and disengaging a platoon mode for the e-pallet with respect to the user, in accordance with the instructions provided by the processor, based on both the relative position and the relative orientation of the user with respect to the e-pallet.

5. The method of claim 1, wherein the taking the control action further comprises disengaging a platoon mode for the e-pallet with respect to the user, in accordance with the instructions provided by the processor, when it is determined that the user has fallen.

6. The method of claim 1, further comprising:
determining when a magnitude of a slope of a terrain on which the e-pallet is travelling exceeds a predetermined threshold, using the sensor data;
wherein the taking the control action further comprises disengaging a platoon mode for the e-pallet, in accordance with the instructions provided by the processor, when it is determined that the magnitude of the slope of the terrain exceeds the predetermined threshold.

7. The method of claim 1, wherein:
the obtaining the sensor data further comprises obtaining the sensor data as to a second e-pallet;
the determining the relative position further comprises determining, via the processor using the sensor data, the relative position of the second e-pallet with respect to the e-pallet;
the determining the relative orientation further comprises determining, via the processor using the sensor data, the relative orientation of the second e-pallet with respect to the e-pallet; and the taking the control action further comprises selectively engaging and disengaging a platoon mode for the e-pallet with respect to the second e-pallet, in accordance with the instructions provided by the processor, based on both the relative position and the relative orientation of the second e-pallet with respect to the e-pallet.

8. A system for controlling movement of an e-pallet, the system comprising:
   one or more sensors configured to obtain sensor data as to a user of the e-pallet; and
   a processor coupled to the one or more sensors and configured to at least facilitate:
      determining, using the sensor data, a relative position of the user with respect to the e-pallet;
      determining, using the sensor data, a relative orientation of the user with respect to the e-pallet; and
      taking a control action for the e-pallet, in accordance with instructions provided by the processor, based on both the relative position and the relative orientation of the user with respect to the e-pallet; and
      determining when the user of the e-pallet has fallen, via the processor, based on the relative position and the relative orientation of the user with respect to the e-pallet.

9. The system of claim 8, wherein:
   the one or more sensors comprise:
      one or more radio-based sensors configured to obtain radio-based sensor data as to the user of the e-pallet; and
      one or more cameras configured to obtain camera data as to the user of the e-pallet; and
   the processor is further configured to at least facilitate:
      determining, using both the radio-based sensor data and the camera data, the relative position of the user with respect to the e-pallet; and
      determining, using both the radio-based sensor data and the camera data, the relative orientation of the user with respect to the e-pallet.

10. The system of claim 8, wherein the processor is further configured to at least facilitate selectively unlocking and locking a door of the e-pallet, in accordance with the instructions provided by the processor, based on both the relative position and the relative orientation of the user with respect to the e-pallet.

11. The system of claim 8, wherein the processor is further configured to at least facilitate controlling movement of the e-pallet by selectively engaging and disengaging a platoon mode for the e-pallet with respect to the user, in accordance with the instructions provided by the processor, based on both the relative position and the relative orientation of the user with respect to the e-pallet.

12. The system of claim 8, wherein the processor is further configured to at least facilitate disengaging a platoon mode for the e-pallet with respect to the user, in accordance with the instructions provided by the processor, when it is determined that the user has fallen.

13. The system of claim 8, wherein the processor is further configured to at least facilitate:
   determining when a magnitude of a slope of a terrain on which the e-pallet is travelling exceeds a predetermined threshold, using the sensor data; and
   disengaging a platoon mode for the e-pallet, in accordance with the instructions provided by the processor, when it is determined that the magnitude of the slope of the terrain exceeds the predetermined threshold.

14. The system of claim 8, wherein:
   the one or more sensors are further configured to obtain the sensor data as to a second e-pallet; and
   the processor is further configured to at least facilitate:
      determining, using the sensor data, the relative position of the second e-pallet with respect to the e-pallet;
      determining, using the sensor data, the relative orientation of the second e-pallet with respect to the e-pallet; and
      selectively engaging and disengaging a platoon mode for the e-pallet with respect to the second e-pallet, in accordance with the instructions provided by the processor, based on both the relative position and the relative orientation of the second e-pallet with respect to the e-pallet.

15. An e-pallet device comprising:
   a body;
   one or more radio-based sensors disposed on or within the body and configured to obtain radio-based sensor data as to a user of the e-pallet device;
   one or more cameras disposed on or within the body and configured to obtain camera data as to the user of the e-pallet device; and
   a processor that is coupled to the one or more radio-based sensors and the one or more cameras, the processor configured to at least facilitate:
      determining, using the radio-based sensor data and the camera data, a relative position of the user with respect to the e-pallet device;
      determining, using the radio-based sensor data and the camera data, a relative orientation of the user with respect to the e-pallet device;
      taking a control action for the e-pallet device, in accordance with instructions provided by the processor, based on both the relative position and the relative orientation of the user with respect to the e-pallet; and
      determining when the user of the e-pallet has fallen, via the processor, based on the relative position and the relative orientation of the user with respect to the e-pallet.

16. The e-pallet device of claim 15, wherein the processor is further configured to facilitate selectively engaging and disengaging a platoon mode for the e-pallet device, based on both the relative position and the relative orientation.

* * * * *